(12) United States Patent
Jeong

(10) Patent No.: US 11,575,303 B2
(45) Date of Patent: Feb. 7, 2023

(54) LINEAR MOTOR AND LINEAR COMPRESSOR HAVING THE SAME

(71) Applicant: LG Electronics Inc., Seoul (KR)

(72) Inventor: Sangsub Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 878 days.

(21) Appl. No.: 16/269,099

(22) Filed: Feb. 6, 2019

(65) Prior Publication Data

US 2019/0245424 A1 Aug. 8, 2019

(30) Foreign Application Priority Data

Feb. 7, 2018 (KR) .................. 10-2018-0015254

(51) Int. Cl.
| | |
|---|---|
| H02K 41/03 | (2006.01) |
| H02K 1/17 | (2006.01) |
| F04B 35/04 | (2006.01) |
| H02K 7/14 | (2006.01) |

(52) U.S. Cl.
CPC .......... H02K 41/031 (2013.01); F04B 35/04 (2013.01); H02K 1/17 (2013.01); H02K 7/14 (2013.01)

(58) Field of Classification Search
CPC ............................. H02K 41/031; H02K 33/16
See application file for complete search history.

(56) References Cited

U.S. PATENT DOCUMENTS

| | | | | |
|---|---|---|---|---|
| 4,023,057 A | * | 5/1977 | Meckling ............... | H02K 23/04 |
| | | | | 310/154.07 |
| 2008/0197719 A1 | * | 8/2008 | Nakagawa ........... | H02K 41/033 |
| | | | | 310/12.32 |
| 2011/0278963 A1 | | 11/2011 | Kaiser et al. | |
| 2017/0016436 A1 | * | 1/2017 | Ki ......................... | F04B 39/121 |

FOREIGN PATENT DOCUMENTS

| | | |
|---|---|---|
| CN | 1265781 | 9/2000 |
| CN | 1618161 | 5/2005 |
| CN | 100521469 | 7/2009 |
| CN | 106685168 | 5/2017 |
| CN | 107023453 | 8/2017 |
| EP | 2594792 | 5/2013 |
| JP | H11126713 | 5/1999 |

(Continued)

OTHER PUBLICATIONS

Office Action in Chinese Appln. No. 201880088852.7, dated Sep. 13, 2021, 19 pages (with English translation).

(Continued)

Primary Examiner — Tulsidas C Patel
Assistant Examiner — Robert E Mates
(74) Attorney, Agent, or Firm — Fish & Richardson P.C.

(57) ABSTRACT

There is provided a linear motor and a linear compressor including the same. The linear motor includes a stator including an air gap, a coil provided in the stator, a mover for reciprocating in the air gap, and at least one magnet fixed to the stator. In the magnet, a length in a first direction that intersects a reciprocating direction of the mover is larger than a length in a second direction that is the reciprocating (Continued)

direction of the mover. Therefore, it is possible to maintain or improve motor efficiency by using an amount of use of a magnet while using a low-priced magnet.

16 Claims, 12 Drawing Sheets

(56) References Cited

FOREIGN PATENT DOCUMENTS

| | | |
|---|---|---|
| JP | H11341778 A | 12/1999 |
| JP | 2000083364 | 3/2000 |
| JP | 2001519638 | 10/2001 |
| JP | 2003174759 | 6/2003 |
| JP | 2003278652 | 10/2003 |
| JP | 2007037273 | 2/2007 |
| KR | 1020050021891 | 3/2005 |
| KR | 1020060064299 | 6/2006 |
| KR | 20100018416 | 2/2010 |
| TW | 434034 | 5/2001 |

OTHER PUBLICATIONS

Notice of Allowance in Chinese Appln. No. 201880088852.7, dated Jul. 6, 2022, 9 pages (with English translation).
Office Action in Chinese Appln. No. 201880088852.7, dated Apr. 11, 2022, 18 pages (with English translation).

* cited by examiner

LINEAR MOTOR AND LINEAR COMPRESSOR HAVING THE SAME

CROSS-REFERENCE TO RELATED APPLICATION

Pursuant to 35 U.S.C. § 119(a), this application claims the benefit of earlier filing date and right of priority to Korean Application No. 10-2018-0015254, filed on Feb. 7, 2018, the contents of which is incorporated by reference herein in its entirety.

BACKGROUND OF THE INVENTION

1. Field of the Invention

The present disclosure relates to a linear motor in which a mover linearly reciprocates and a linear compressor including the same.

2. Background of the Invention

In a linear motor, unlikely in a common reciprocating motor, a mover linearly reciprocates by interacting with a stator. A linear compressor adopts the linear motor so that a piston is combined with the mover. Therefore, while reciprocating with the mover, the piston performs suction stroke while moving from a cylinder to a bottom dead center and performs compression stroke while moving from the cylinder to a top dead center.

The linear motor includes a core through which magnetic flux flows, a coil to which a current is applied, and a magnet that forms a magnetic circuit with the core and the coil. The magnet is combined with the mover and may reciprocate for a stator. As occasion demands, the magnet may be fixed to and combined with the stator. FIGS. 1A through 1C are schematic diagrams illustrating a relationship among a core, a coil, and a magnet in a conventional linear motor. FIGS. 1A and 1B illustrate and example in which the magnet is combined with the mover. FIG. 1C illustrates an example in the magnet is combined with the stator.

In FIG. 1A, the magnet 1 that is a 1-pole structured magnet magnetized in a radial direction reciprocates by interacting with magnetic force created by an alternating current. In FIG. 1B, the magnet 1 is a 3-pole structured magnet magnetized in a radial direction. Like the magnet in FIG. 1A, the magnet 1 reciprocates. The 1-pole structure as illustrated in FIG. 1A may be applied when rare earth resources (for example, NdFeB and commonly referred to as a neodymium (Nd) magnet) with strong magnetic force is used. As illustrated in FIG. 1B, the 3-pole structure is suitable for a structure for securing total magnetic force when a ferrite magnet with weak magnetic force is used.

On the other hand, in FIG. 1C, the magnet 1 is attached to an air gap surface 3a of the stator 3 unlike in FIGS. 1A and 1B. In this case, the core 4a formed of a magnetic substance is provided in the mover 4 and the core 4a reciprocates while moving in a magnetization direction in which magnetic flux caused by a current of the coil 2 and magnetic flux caused by the magnet 1 are combined with each other.

However, in the above-described conventional linear motor and the linear compressor including the same, when a rare earth magnet (hereinafter, referred to as the Nd magnet) with large magnetic force is used in order to increase the output of the compressor, since the Nd magnet is high-priced, manufacturing expenses of the compressor increase.

On the other hand, when the ferrite magnet is used considering manufacturing expenses of the linear motor and the linear compressor, since the ferrite magnet has weak magnetic force due to a characteristic of the ferrite magnet, a large amount of magnet is required. However, when the large amount of magnet is combined with the mover, a weight of an entire vibrating sieve increases and load of the motor increases so that loss of the motor increases and it is disadvantageous to high speed driving.

In particular, in a conventional linear compressor, in order to efficiently implement a reciprocating motion of a piston, a mechanical resonance spring such as a coil spring is mainly used. The mechanical resonance spring is resonated by the reciprocating motion of the piston with a previously set spring constant and amplifies the reciprocating motion of the piston. In the mechanical resonance spring, since a resonance frequency is limited, driving of various frequency bands may not be performed. Considering the above disadvantage, recently, research on removing or replacing the mechanical resonance spring is being performed.

For example, in the patent document 1, a configuration of a magnetic resonance spring for generating resilience that pulls a vibrating sieve in a central direction of vibration other than thrust by which a driver pushes the vibrating sieve in a direction in which the vibrating sieve is to be driven by introducing a mover including two or three magnets is suggested. Since a strong magnetic spring exists in such a structure, a linear reciprocating motion may be implemented by using a spring without a mechanical spring or a spring with small stiffness.

Considering this, when the Nd magnet with a high amount of magnetic flux is combined with the mover, an amount of use of the magnet is reduced so that a weight of the mover may be reduced. However, since a price of the Nd magnet is no less than ten times higher than that of the ferrite magnet, manufacturing expenses of the linear motor and a linear compressor may excessively increase in comparison with effect of reducing the weight of the mover.

In addition, as illustrated in FIG. 1C, the weight of the mover may be reduced by attaching the magnet to the air gap surface of the stator. However, when an area of the air gap surface increases, sizes of the linear motor and the linear compressor increase. Therefore, since the area of the air gap surface may not be excessively increased, there are limitations on securing a surface area of the magnet. As a result, the amount of use of the magnet is limited so that the low-priced ferrite magnet may not be used and the high-priced Nd magnet is used. Therefore, the manufacturing expenses of the linear motor and the linear compressor increase.

SUMMARY OF THE INVENTION

Therefore, an aspect of the detailed description is to provide a linear motor capable of reducing manufacturing expenses thereof by using a low-priced magnet and a linear compressor including the same.

In addition, another aspect of the detailed description is to provide a linear motor capable of maintaining or improving motor efficiency by increasing an amount of use of a magnet while using a low-priced magnet and a linear compressor including the same.

In addition, another aspect of the detailed description is to provide a linear motor capable of improving motor efficiency by reducing a weight of a mover while increasing an amount of use of a low-priced magnet and suitable for high speed driving and a linear compressor including the same.

In addition, another aspect of the detailed description is to provide a linear motor advantageous to miniaturization by not increasing a size of a stator while increasing an amount of use of a low-priced magnet as the magnet is applied to the stator and a linear compressor including the same.

To achieve these and other advantages and in accordance with the purpose of this specification, as embodied and broadly described herein, a linear motor in which a magnet is inserted into a stator provided with a wound coil, a magnetic substance core that is not a permanent magnet is provided in a mover, and the magnet is formed such that a length of the magnet in a direction that intersects a motion direction of the mover is larger than a length of the magnet in a motion direction may be provided.

Here, the magnet may be formed of a ferrite magnet.

The magnet may be formed such that a length of a surface from which magnetic flux comes out is larger than an axial direction length of an air gap in which the mover reciprocates.

Magnets positioned at both sides about the center of the wound coil in an axial direction may be symmetrical with each other.

Magnets positioned at both sides about the center of the wound coil in an axial direction may be unsymmetrical with each other.

In addition, there is provided a linear motor including a stator including an air gap, a coil provided in the stator, a mover reciprocating in the air gap, and at least one magnet fixed to the stator. In the magnet, a length in a first direction that intersects a reciprocating direction of the mover is larger than a length in a second direction that is the reciprocating direction of the mover.

Here, the magnet may be inserted into and fixed to a stator.

Based on the coil, the magnet may be provided at at least one side of both sides of the mover in a reciprocating direction.

The magnet may be entirely formed of a ferrite magnet.

The magnet may be formed of a plurality of materials and at least some of the plurality of materials may be formed of a ferrite magnet.

Among the plurality of magnets, the ferrite magnet may have a larger surface area than other magnets.

The magnet positioned at one side based on the coil in the second direction that is the motion direction of the mover may be plural.

The plurality of magnets may be separate from each other by a predetermined distance in the second direction The plurality of magnets may be arranged in the first direction.

The stator includes a first yoke that forms a magnetic path in the second direction that is an axial direction and a second yoke and a third yoke positioned at both sides of the first yoke to form a magnetic path in the first direction that is a radial direction. In the second yoke and the third yoke, a first insertion groove and a second insertion groove into which the magnet is inserted may be longitudinally formed in the first direction.

The first insertion groove may be positioned in a center of the second direction of the second yoke and the second insertion groove may be positioned in a center of the second direction of the third yoke.

In the second yoke or the third yoke, a first direction cross-sectional area of a portion excluding the first insertion groove and the second insertion groove may be equal to or larger than a second direction cross-sectional area of the first yoke.

Not a permanent magnet but a magnetic substance core is provided in the mover and a second direction length of the magnetic substance core may be larger than a second direction length of the magnet.

The mover is provided with at least one magnetic substance core and, in an alignment state in which the second direction center of the mover coincides with the second direction center of the stator, the magnetic substance core may be provided to overlap the magnet in the second direction.

The mover is further provided with the magnet and, in an alignment state in which the second direction center of the mover coincides with the second direction center of the stator, the magnet provided in the mover may be provided not to overlap the magnet provided in the stator in the second direction.

In addition, there is provided a linear compressor including a driving unit for reciprocating a mover, a compression unit for compressing a refrigerant while a piston combined with the mover of the driving unit reciprocates in a cylinder. The driving unit is formed of the previously described linear motor.

In the linear motor according to the present invention and the linear compressor including the same, as the magnet is inserted into the stator, it is possible to maintain or improve motor efficiency by increasing an amount of use of the magnet while using the low-priced magnet.

In addition, according to the present invention, as the magnet is inserted into the stator, it is possible to improve motor efficiency by reducing the weight of the mover while increasing the amount of use of the low-priced magnet and to be suitable for high speed driving.

In addition, according to the present invention, as the magnet is inserted into the stator, it may be advantageous to miniaturization of the linear motor and the linear compressor by not increasing the size of the stator while increasing the amount of use of the low-priced magnet.

According to the present invention, as the magnet is inserted into the stator, the magnet is stable fixed so that reliability may improve.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the linear compressor according to the present invention, with reference to the accompanying drawings. For the sake of brief description with reference to the drawings, the same or equivalent components will be provided with the same reference numbers, and description thereof will not be repeated. In addition, in describing embodiments disclosed in the current specification, when it is determined that detailed description of a related well-known technology may blur the gist of the embodiment disclosed in the current specification, the detailed description will not be given.

The present invention may be modified variably and may have various embodiments, particular examples of which will be illustrated in drawings and described in detail. However, it is to be understood that the present invention is not limited to a specific disclosed form, but includes all modifications, equivalents, and substitutions without departing from the scope and spirit of the present invention. The singular forms "a", "an" and "the" are intended to include the plural forms as well, unless the context clearly indicates otherwise.

The linear compressor according to the present invention includes a linear motor and sucks and compresses fluid and discharges the compressed fluid. The linear motor and the linear compressor according to the present invention may become components of a refrigeration cycle. Hereinafter, an example in which the fluid is used as a refrigerant for circulating the refrigeration cycle will be described.

Figure 1A:
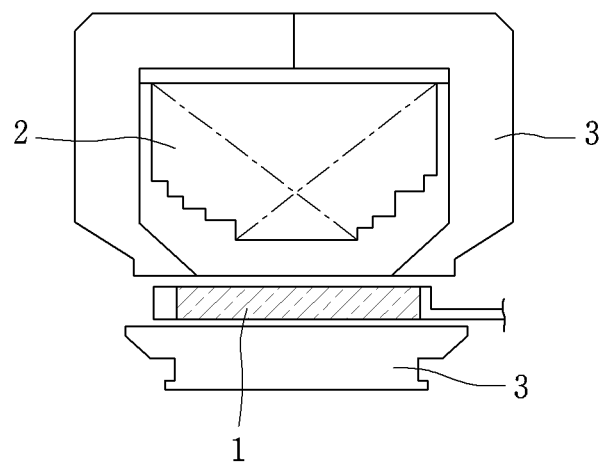
FIGS. 1A through 1C are schematic diagrams illustrating a relationship among a core, a coil, and a magnet in a conventional linear motor.
Figure 1B:
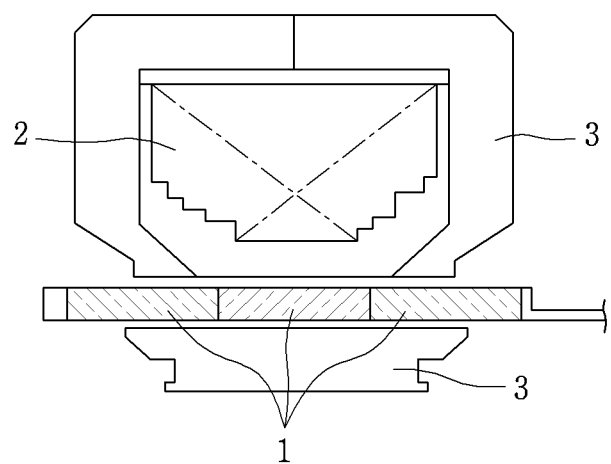
Figure 1C:
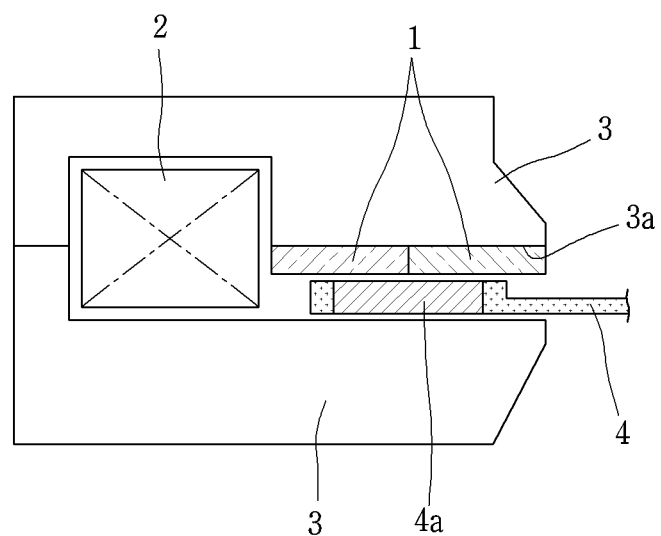
Figure 2:
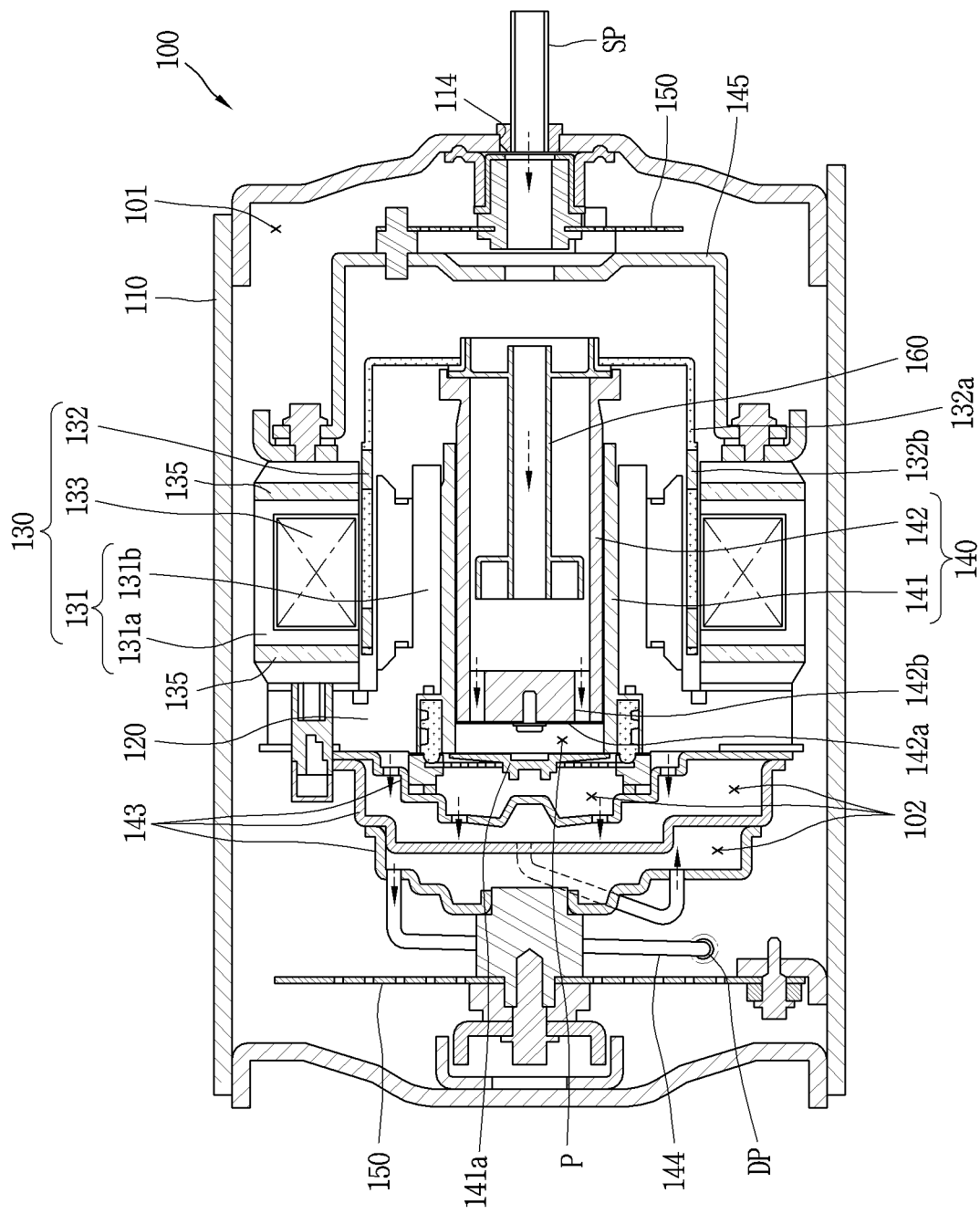
FIG. 2 is a vertical cross-sectional view illustrating a linear compressor according to an embodiment of the present invention.

FIG. 2 is a vertical cross-sectional view illustrating a linear compressor according to an embodiment of the present invention. Referring to FIG. 2, a linear compressor 100 according to a current embodiment includes a casing 110, a frame 120, a driving unit 130, and a compression unit 140.

The casing 110 may form a closed space. The closed space may become a suction space 101 in which a refrigerant sucked to be compressed is filled. In order for the refrigerant to be sucked into the suction space 101, an inlet 114 is formed in the casing 110 and a suction pipe SP may be connected to the inlet 114. In addition, an outlet 115 for discharging the refrigerant from a discharge space 102 to be described later to the outside is formed in the casing 110 and a discharge pipe DP may be connected to the outlet 115.

The frame 120 may be provided in the casing 110 in order to support the driving unit 130 and the compression unit 140. The frame 120 may be connected to and supported by to the other end of a support spring 150 of which one end is positioned to be fixed to the casing 110. The support spring 150 may be formed of a plate spring as illustrated in FIG. 2 or a coil spring.

The driving unit 130 may generate a reciprocating motion of the linear compressor 100 according to the current embodiment. For this purpose, the driving unit 130 may include a stator 131 and a mover 132. The stator 131 may be combined between the frame 120 and a back cover 145 to be described later. The stator 131 may include an outer stator 131a and an inner stator 131b. A mover 132 may be positioned between the outer stator 131a and the inner stator 131b.

A wound coil 133 may be mounted in the outer stator 131a and the mover 132 may include a movable element core 132b formed of a magnetic substance in a connection frame 132a. The movable element core 132b is not a magnet that means a permanent magnet and may be formed of a ferromagnetic substance so as to form a magnetic circuit with the stator 131 by the wound coil 133. Therefore, in the driving unit 130 according to the current embodiment, a magnet 135 that is a permanent magnet is combined not with the mover 132 but with the stator 131. A combination structure of the magnet will be described later.

On the other hand, the compression unit 140 sucks, compresses, and discharges the refrigerant in the suction space 101. The compression unit 140 may be positioned in the center of the casing 110 inward the inner stator 131b and includes a cylinder 141 and a piston 142. The cylinder 141 is supported by the frame 120 and a compression chamber P may be formed in the cylinder 141.

The cylinder 141 may be cylindrical such that both ends of the cylinder are opened so as to accommodate the refrigerant and the piston 142 therein. One end of the cylinder 141 may be closed by a discharge valve 141a and a discharge cover 143 may be mounted in the outside of the discharge valve 141a.

The discharge space 102 may be formed between the discharge valve 141a and the discharge cover 143. That is, the compression chamber P and the compression cover 143 may form spaces separate from each other by the discharge valve 141a. In the casing 110, a loop pipe 144 that extends so as to connect the outlet 115 and the discharge space 102 may be provided.

The piston 142 is inserted into the opened end of the cylinder 141 and may close the compression chamber P. The piston 142 is connected to the previously described mover 132 and may reciprocate with the mover 132. The inner stator 131b and the cylinder 141 may be positioned between the mover 132 and the piston 142. Therefore, the mover 132 and the piston 142 may be combined with each other by the additional connection frame 132a provided to retour the cylinder 141 and the inner stator 131b. The above-described movable element core 132b may be inserted into and combined with the connection frame 132a or may be attached to and combined with an outer surface of the connection frame 132a.

On the other hand, an inner space of the piston 142 and the compression chamber P may be connected by a suction port 142b. That is, when the refrigerant received from the suction space 101 to an inner space of the piston 142 flows through the suction port 142b and the suction valve 142a that covers the suction port 142b is opened by pressure of the refrigerant, the refrigerant may be sucked into the compression chamber P.

The linear compressor according to the current embodiment operates as follows.

That is, when a current is applied to the driving unit 130, magnetic flux may be formed in the stator 131. The mover 132 may linearly reciprocate by electromagnetic force generated by magnetic flux formed in the stator 131.

When the mover 132 reciprocates, the piston 142 connected to the mover 132 may reciprocate with the piston 142. The piston 142 that reciprocates in the cylinder 141 repeats a motion that increases and reduces a volume of the compression chamber P.

When the piston 142 moves while increasing the volume of the compression chamber P, pressure in the compression chamber P is reduced. Therefore, the suction valve 141b formed in the cylinder 141 is opened and the refrigerant that stays in the suction space 101 may be sucked into the compression chamber P.

When the piston 142 moves while reducing the volume of the compression chamber P, the pressure in the compression chamber P increases. When the pressure in the compression chamber P reaches previously set pressure, the discharge valve 141a mounted in the cylinder 141 is opened so that the refrigerant is discharged to the discharge space 102.

While suction stroke and compression stroke of the piston 142 are repeated, a series of processes in which the refrigerant of the suction space 101 received to the suction pipe SP is sucked into the compression chamber P, is compressed, and is discharged to the outside of a compressor through the discharge space 102, the loop pipe 144, and the discharge pipe DP.

On the other hand, in the linear motor according to the current embodiment and the linear compressor including the same, the driving unit functions as a magnetic resonance spring that induces a resonance motion of the piston. That is, when a current is applied to the wound coil of the driving unit, magnetic flux is formed in the stator and force by which the mover may reciprocate may be generated by interaction between magnetic flux formed by applying a current and magnetic flux formed by a magnet.

Here, in order for the mover to reciprocate at a high speed, it is advantageous that a weight of the mover be small. However, in a conventional linear motor, when a permanent magnet is provided in a mover, a weight of the mover increases so that there are limitations on moving the mover at a high speed. Furthermore, when a ferrite magnet is used, an amount of use of the magnet increases in order to secure an amount of magnetic flux so that the weight of the mover may increase. Such a phenomenon is more remarkably generated in a linear motor that adopts a magnetic resonance spring. However, as described above, when a neodymium (Nd) magnet with a large amount of magnetic flux is used, the amount of use of the magnet is reduced so that the weight of the mover may be reduced. However, since a price of the Nd magnet is no less than ten times higher than that of the ferrite magnet, manufacturing expenses of the linear motor and a linear compressor may excessively increase in comparison with effect of reducing the weight of the mover. In addition, as described above, when the magnet is attached to an air gap surface of a stator, the weight of the mover may be reduced. However, since an area of the air gap surface is not large, there are limitations on securing a surface area of the magnet. As a result, the amount of use of the magnet is limited. Therefore, since the low-priced ferrite magnet may not be used and the high-priced Nd magnet is used, the manufacturing expenses of the linear motor and the linear compressor increase.

Therefore, an object of the present invention is to maintain or increase efficiency of the linear motor by reducing the weight of the mover while reducing production expenses of the linear motor and the linear compressor including the linear motor by using the low-priced ferrite magnet.

For this purpose, according to the current embodiment, the ferrite magnet is provided not in the mover but in the stator so that the weight of the mover is reduced. The magnet is not limited to the ferrite magnet and is not limited to not being used in the mover, which will be described later.

Figure 3:
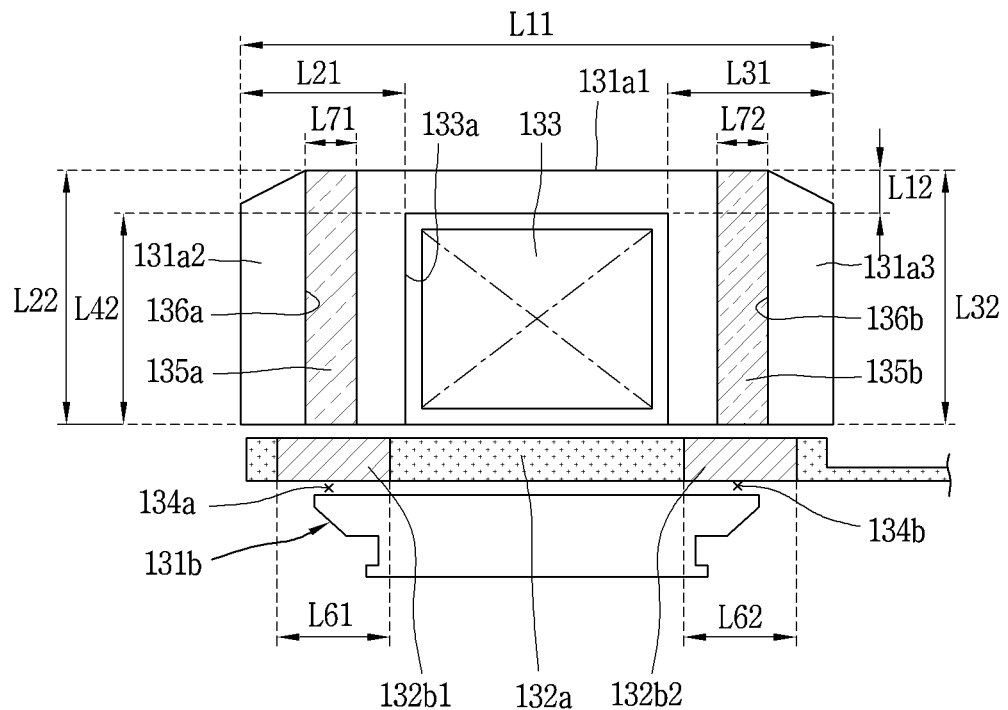
FIG. 3 is a cross-sectional view schematically illustrating a linear motor according to a current embodiment.
Figure 4A:
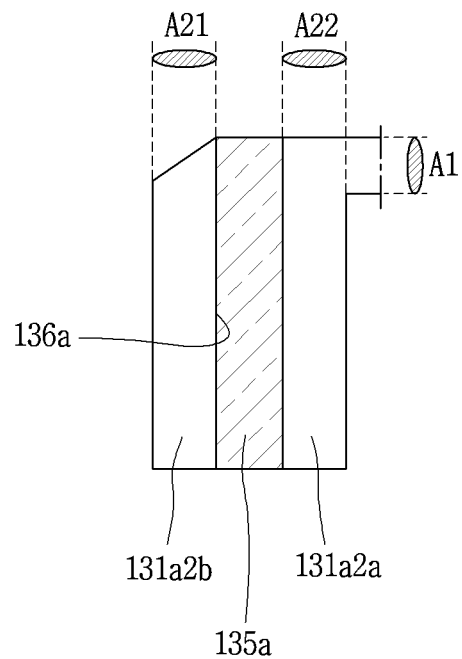
FIGS. 4A and 4B are cross-sectional views illustrating enlargements of a second yoke and a third yoke in the linear motor of FIG. 3.
Figure 4B:
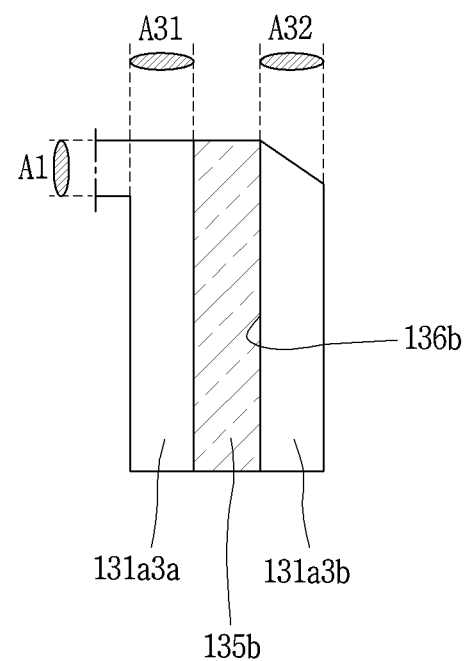

FIG. 3 is a cross-sectional view schematically illustrating a linear motor according to a current embodiment. FIGS. 4A and 4B are cross-sectional views illustrating enlargements of a second yoke and a third yoke in the linear motor of FIG. 3. The linear motor illustrated in FIG. 3 is a 2 air gap linear motor having air gaps at both sides in an axial direction (hereinafter, a reciprocating direction of a mover is referred to as an axial direction) about a wound coil. However, as occasion demands, the linear motor may be a 1 air gap linear motor having an air gap only at one side in the axial direction about the wound coil. Detailed description of the 1 air gap linear motor will not be given.

As illustrated in FIG. 3, in the linear motor according to the current embodiment, the inner stator 131b that forms the stator 131 may be arranged to be mounted on an outer circumference surface of the cylinder 141 that forms the compression unit and to surround the cylinder 141 in a circumference direction and the outer stator 131a may be arranged to surround the inner stator 131b in the circumference direction.

The outer stator 131a and the inner stator 131b may be arranged to be separate from each other so as to form air gaps 134a 134b in which the mover 132 reciprocates. In the stator 131 according to current embodiment, the air gaps 134a and 134b may be formed at both sides of the wound coil 133 in an axial direction.

Since the wound coil 133 is settled in the center of the outer stator 131a in the axial direction, the wound coil 133 is '∩'-shaped and the inner stator 131b may be '-'-shaped to be long in the axial direction. Therefore, a coil winding groove 133a is formed in the center of the outer stator 131a and the above-described air gaps 134a and 134b may be respectively formed at both sides of the coil winding groove 133a.

The outer stator 131a may be formed of an outer circumference surface yoke (hereinafter, referred to as a first yoke) 131a1 that forms an outer circumference surface of the coil winding groove 133a and a plurality of side surface yokes (hereinafter, referred to as a second yoke and a third yoke) 131a2 and 131a3 that are connected to both ends of the first yoke 131a1 and form both side surfaces of the coil winding groove 133a in the axial direction.

The first yoke 131a1 is longitudinal in the axial direction (a movement direction of the mover) so that an axial direction length L11 is larger than a radial direction (a direction orthogonal to the movement direction of the mover) length L12. The second yoke 131a2 and the third yoke 131a3 are longitudinal in the radial direction so that radial direction lengths L22 and L32 may be larger than axial direction lengths L21 and L31.

The radial direction length L12 of the first yoke 131a1 is smaller than the radial direction length L22 or L32 of the second yoke 131a2 or the third yoke 131a3. The axial direction length L21 or L31 of the second yoke 131a2 or the third yoke 131a3 may be larger than or equal to an radial direction length L42 of the coil winding groove 133a. However, in the one-air gap linear motor having one air gap 134, an axial direction length of a side surface yoke may be larger than the axial direction length of the coil winding groove.

Here, the second yoke 131a2 and the third yoke 131a3 that form the side surface yoke may be symmetrical with each other based on the coil winding groove 133a or may be unsymmetrical with each other as occasion demands.

When the wound coil 133 is wound in the form of a circle, a magnetic circuit is formed in the order of 'the second yoke, the first yoke, the third yoke, and the inner stator' including the inner stator or is formed in reverse order. Therefore, when the magnet is provided in the stator, the magnet may be provided in a direction in which the amount of magnet flux may be maximally secured.

For this purpose, as illustrated in FIG. 3, the magnet 135 may be inserted into the outer stator 131a and may be combined with the outer stator 131a. That is, the magnet 135 may be inserted into the second yoke 131a2 and the third yoke 131a3 that form the side surface yoke in the radial direction. Therefore, a first insertion groove 136a may be formed in the second yoke 131a2 so that a first magnet 135a to be described later may be inserted into the first insertion groove 136a and a second insertion groove 136b may be formed in the third yoke 131a3 so that a second magnet 135b to be described later may be inserted into the second insertion groove 136b. The first insertion groove 136a and the second insertion groove 136b may be longitudinal in the radial direction.

The first insertion groove 136a and the second insertion groove 136b may be in the form of a groove by leaving portions of the second yoke 131a2 and the third yoke 131a3 in the form of a bridge or the first outer yoke and the first inner yoke that form the second yoke. Or the second outer yoke and the second inner yoke that form the third yoke may be attached and fixed to each other with the magnet interposed between the first outer yoke and the first inner yoke or between the second outer yoke and the second inner yoke. In this case, a space between the yokes is referred to as an insertion groove for convenience sake.

As illustrated in FIGS. 4A and 4B, axial direction cross-sectional areas A21 and A22 of portions excluding the first insertion groove 136a and the second insertion groove 136b, that is, a second inner yoke 131a2a and a second outer yoke 131a2b of the second yoke 131a2 and a third inner yoke 131a3a and a third outer yoke 131a3b of the third yoke 131a3 may be equal to or larger than a radial direction cross-sectional area A1 of the first yoke 131a1 so as to suppress a bottle neck of magnetic flux.

A first exposing hole 137a and a second exposing hole 137b may be formed so that the first insertion groove 136a and the second insertion groove 136b respectively penetrate an inner circumference surface of the second yoke 131a2 and an inner circumference surface of the third yoke 131a3. Therefore, as an inner circumference surface (that is, a surface that faces the mover) of the first magnet 135a and an inner circumference surface of the second magnet 135b are respectively exposed to the air gaps 134a and 134b, it is possible to prevent magnetic flux from leaking from the outer yokes 131a2b and 131a 3b to the inner yokes 131a2a and 131a3a without passing the magnets 135a and 135b.

Figure 5:
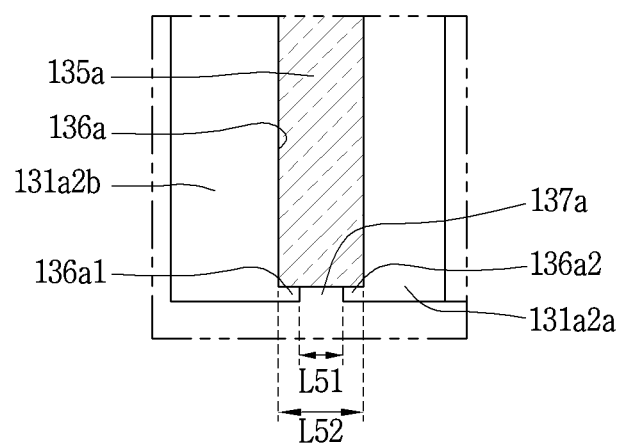
FIGS. 5 and 6 are cross-sectional views illustrating other examples of an insertion groove in the linear motor of FIG. 3.
Figure 6:
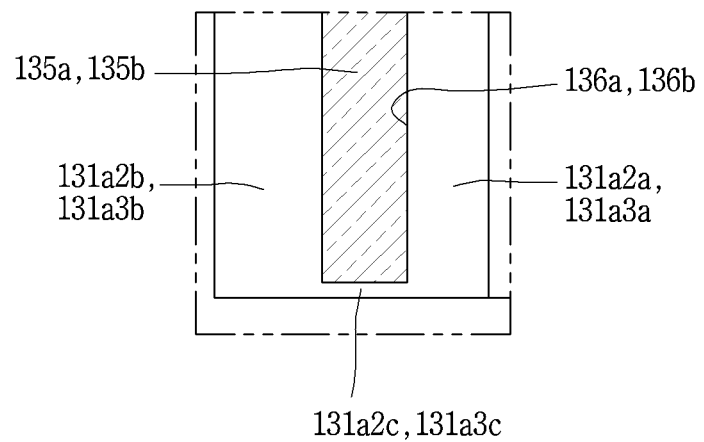

In this case, an axial direction length of the movable element core 132b may be reduced by minimizing axial direction lengths of the first exposing hole 137a and the second exposing hole 137b. When the axial direction length of the movable element core 132b is reduced, an amount of use of the movable element core 132b of which weight per unit area is larger than that of the connection frame 132a is reduced so that the weight of the mover 132 may be reduced, which may be implemented by minimizing a distance between poles related to the axial direction length of a stator core 132b. FIGS. 5 and 6 are cross-sectional views illustrating other examples of an insertion groove in the linear motor of FIG. 3.

Figure 11:
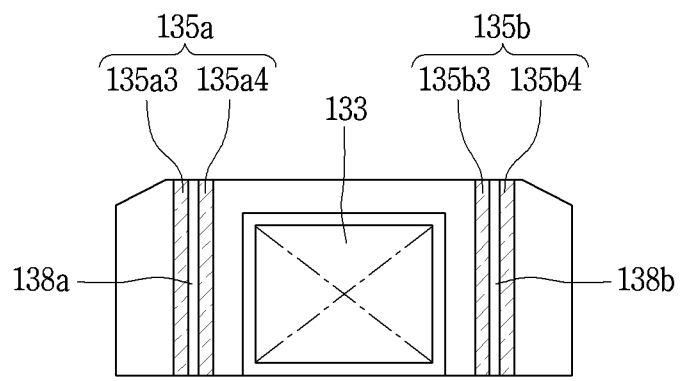

As illustrated in FIG. 5, for example, the second yoke 131a2 may be implemented by forming an axial direction length L51 of the first exposing hole 137a to be smaller than an axial direction length L52 of the first insertion groove 136a so that a distance between an outer pole 136a1 and an inner pole 136a2 that form both ends of the first exposing hole 137a is minimized, which may be applied to the case in which the first magnet or the second magnet is plural as illustrated in the embodiment of FIG. 11 to be described later.

However, as illustrated in FIG. 6, the second yoke 131a2 and the third yoke 131a3, as previously described, may connect the outer yokes 131a2b and 131a3b and the inner yokes 131a2a and 131a3a by leaving the connectors 131a2c and 131a3c in a portion, that is, an inner circumference surface of the stator core in the form of a bridge. Therefore, it is possible to easily insert the magnets and to prevent the magnets from deviating. In this case, a cross-sectional area of a connector may be remarkably smaller than cross-sectional areas of both the outer yokes 131a2b and 131a3b and the inner yokes 131a2a and 131a3a so as to prevent magnetic flux from leaking.

In addition, since the magnets 135a and 135b may be as long as possible in the radial direction, correctly, equal to or larger than the radial direction lengths L22 and L32 of the second yoke 131a2 and the third yoke 131a3 since axial direction both side surfaces form a magnetic path area. Therefore, for example, radial direction both ends of the first magnet 135a approximately coincide with an outer circumference surface and an inner circumference surface of the second yoke (the same to the third yoke) 131a2 or may be formed to have a length as small as a pole. The magnet may be singular as illustrated in FIG. 3. However, as occasion demands, the magnets may be plural. Considering an assembly process of the magnet, the magnet may be singular, if possible. In addition, when the magnets are plural, the magnets may be formed of different materials, which will be described in another embodiment later.

In addition, the magnets 135a and 135b may vary in accordance with a shape of the outer stator 131a. For example, when the outer stator 131a is cylindrical, the magnet may be circular or in the form of an arc such that a length of an inner circumference surface is different from that of an outer circumference surface. However, when the outer stator 131a is formed of the block-shaped stator core by laminating a plurality of lamination sheets, during axial direction projection, the stator core is in the form of an arc such that the length of the inner circumference surface is equal to that of the outer circumference surface. Therefore, the magnet may be in the form of an arc such that the length of the inner circumference surface is equal to that of the outer circumference surface like the stator core that forms the outer stator 131a. In this case, the magnet may have the same cross-sectional area as the stator core in a circumference direction. However, as occasion demands, the magnet slightly protrudes in the circumference direction of the stator core so that magnetic flux density may increase.

In addition, since the magnetic path area of the magnets 135a and 135b is proportional to an area of the axial direction both side surfaces, an axial direction thickness L52 of the magnet may not matter much. When axial direction thicknesses of the magnets 135a and 135b are excessively thick, the magnetic path area of the second yoke 131a2 or the third yoke 131a3 is reduced so that the bottle neck may be generated. Therefore, the axial direction thickness L52 of the magnet may be about no more than ⅓ of the axial direction lengths L21 and L31 of the yokes into which the magnets 135a and 135b are inserted.

In addition, the magnets 135a and 135b may be magnetized so that the first magnet 135a inserted into the second yoke 131a2 and the second magnet 135b inserted into the third yoke 131a3 are magnetized in opposite directions. Therefore, thrust and resetting force are generated with respect to the mover 132 so that the mover 132 may reciprocate.

On the other hand, the mover 132 may be positioned in the air gaps 134a and 134b so as to reciprocate. The mover 132 may be fixed to the piston 142 by the connection frame 132a as previously described. The mover 132 may include the stator core 132b in order for the cylinder 141 to reciprocate in an axial direction.

The movable element core 132b is formed by laminating a plurality of movable element sheets in a circumference direction or in an axial direction and is attached to the connection frame 132a or may be fixedly combined with the connection frame 132a by an additional fixing member. The movable element core 132b may be inserted into and combined with the connection frame 132a in order to minimize a radial direction distance between the air gaps 134a and 134b. A combination relationship between the connection frame and the movable element core is not described in detail in the drawings of the current specification including FIG. 3. However, for reference, the movable element core is molded in or inserted into the connection frame and is attached to the connection frame or is concavo-convexly combined with and fixed to the connection frame.

In addition, the movable element core 132b may correspond the second yoke 131a2 and the third yoke 131a3 of the outer stator 131a. For example, in a state in which the mover 132 is aligned in the center of the stator 131 (hereinafter, an alignment state), in the movable element core 132b, a first movable element core 132b1 and a second movable element core 132b2 are provided in positions in which the first movable element core 132b1 and the second movable element core 132b2 may respectively overlap the first magnet 135a and the second magnet 135b in a radial direction. If possible, in the alignment state, an axial direction center of the first magnet 135a and an axial direction center of the first movable element core 132b1 respectively coincide with an axial direction center of the second magnet 135b and an axial direction center of the second movable element core 132b2.

In addition, as illustrated in FIG. 3, axial direction lengths L61 and L62 of the movable element cores 132b1 and 132b2 are larger than axial direction thicknesses L71 and L72 of the magnets, that is, an axial direction length L52 of each of the first insertion groove 136a and the second insertion groove 136b. It is possible to maintain resilience by forming the movable element cores 132b1 and 132b2 to have axial direction lengths in which, during a reciprocating motion of the mover 132, at least portions of the movable element cores 132b1 and 132b2 may overlap the magnets 135a and 135b in a radial direction.

Figure 7A:
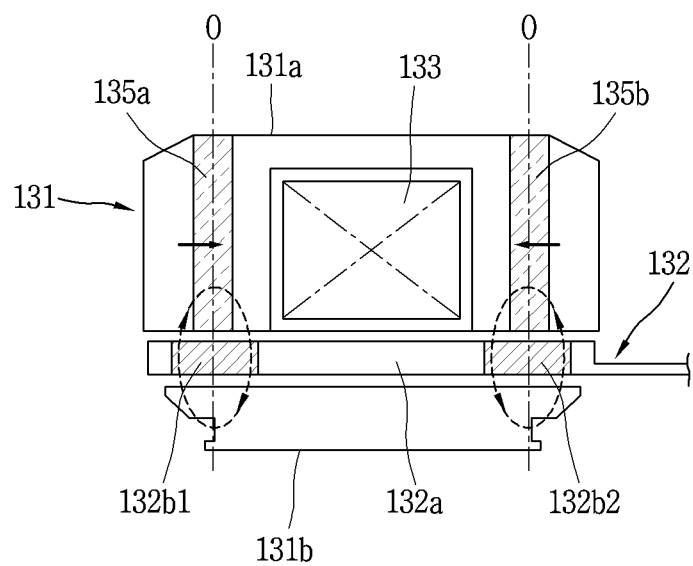
FIGS. 7A and 7C are schematic diagrams illustrating an example in which an induced voltage is formed in a linear motor according to the current embodiment.

In the above-described linear motor according to the current embodiment, the mover operates as follows. FIGS. 7A and 7C are schematic diagrams illustrating an example in which an induced voltage is formed in a linear motor according to the current embodiment. FIGS. 8A and 8B are schematic views illustrating a thrust generation principle.

That is, as illustrated in FIG. 7A, when the movable element core 132b is in the alignment state (in which a position of the mover is 0), since main magnetic flux does not flow in the stator, magnetic flux linkage is also 0 (zero).

Figure 7B:
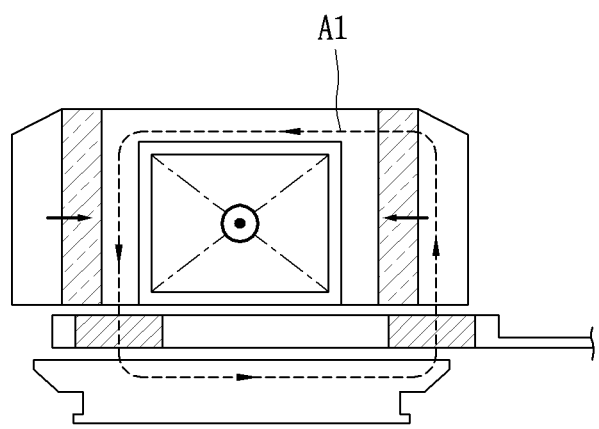
Figure 7C:
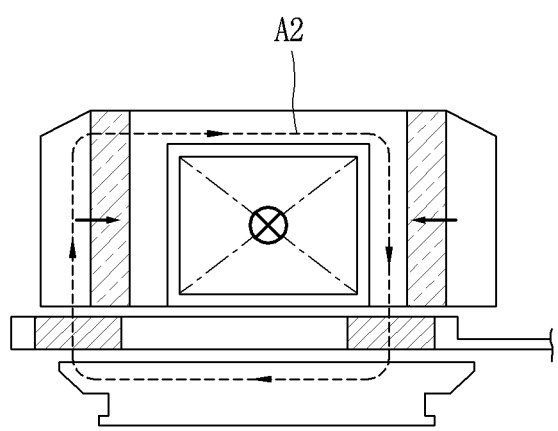
Figure 8A:
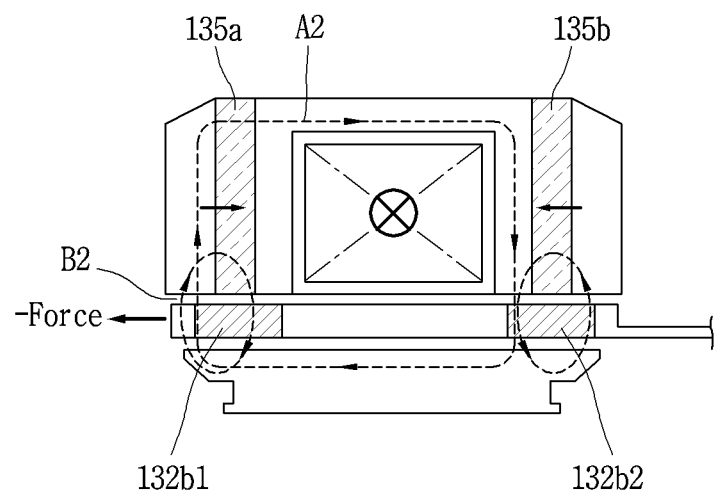
FIGS. 8A and 8B are schematic views illustrating a thrust generation principle.
Figure 8B:
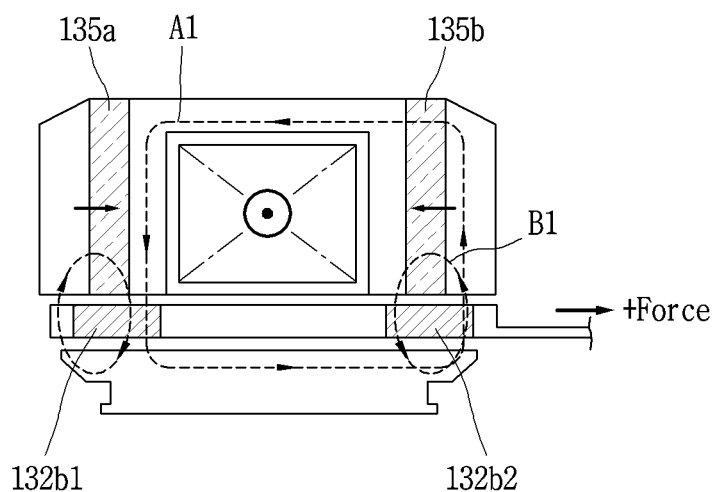

Next, as illustrated in FIGS. 7B and 7C, when power is applied to the wound coil 133 so that the mover 132 moves to the right or left of a drawing, magnetic flux flows in the stator 131 in a counterclockwise direction or clockwise direction. At this time, since main magnetic fluxes A1 and A2 are linked to the wound coil 133, an induced voltage is generated in the movable element cores 132b1 and 132b2.

When the induced voltage is generated as described above, thrust is generated in the mover 132 from side to side of a drawing in accordance with a direction of a current applied to the wound coil 133. For example, as illustrated in FIG. 8A, when a current flows to come out from a plane, the main magnetic flux A2 of the wound coil 133 flows in the clockwise direction. At this time, in the main magnetic flux A2, the thrust is generated in a direction in which the main magnetic flux A2 is combined with a magnetic flux B2 caused by the first magnet 135a, that is, in a negative direction (to the left of the drawing).

On the other hand, as illustrated in FIG. 8B, when the current flows to come into the plane, the main magnetic flux A1 of the wound coil 133 flows in the counterclockwise direction. At this time, in the main magnetic flux A1, the thrust is generated in a direction in which the main magnetic flux A1 is combined with a magnetic flux B1 caused by the second magnet 135b, that is, in a positive direction (to the right of the drawing).

On the other hand, the stator 131 and the mover 132 according to the present invention generate resilience other than thrust for a reciprocating motion of the piston 142. Here, thrust means force that pushes the mover 132 in a motion direction. In detail, thrust is applied to face a top dead center during compression stroke and to face a bottom dead center during suction stroke. On the other hand, resilience means force that pulls the mover 132 in a reference position (0) direction. That is, a value of resilience may be 0 in the reference position (0) and increases or is reduced toward the top dead center or the bottom dead center away from the reference position (0) so that the absolute value of resilience increases away from the reference position (0). Therefore, the piston 142 compresses the refrigerant of the compression chamber by the magnetic resonance spring and may discharge the refrigerant.

As described above, as the magnet is inserted into the outer stator, a surface area of the magnet may increase. As the surface area of the magnet increases, it is possible to secure a required output of the linear motor while using a low-priced ferrite magnet with low magnetic flux density. Therefore, it is possible to reduce production expenses of the linear motor.

As the heavy magnet is inserted into and fixed to the stator and the light movable element core is mounted in the mover, it is possible to implement a high speed linear motor for the same capacity by reducing the weight of the mover.

Furthermore, as the magnet is inserted into and fixed to the yoke in a radial direction, it is possible to prevent a size of the linear motor from increasing while increasing an amount of use of the magnet. Therefore, it is possible to miniaturize the linear motor and the linear compressor while reducing manufacturing expenses of the linear motor and the linear compressor in comparison with the same capacity.

On the other hand, in the linear motor according to the present invention, another embodiment of the magnet will be described as follows.

That is, in the above-described embodiment, the first magnet and the second magnet, each of which is singular, are provided in one stator core. However, according to a current embodiment, the first magnet and the second magnet, each of which are plural, may be provided in one stator core.

Figure 9:
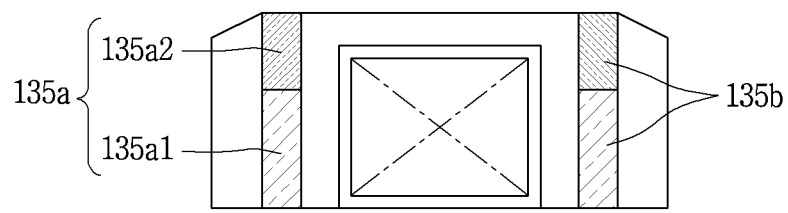
FIGS. 9 through 11 are schematic diagrams illustrating other embodiments of a magnet in the linear motor according to the current embodiment.

As illustrated in FIG. 9, each of the first magnet 135a and the second magnet 135b according to the current embodiment may be plural. For example, the first magnet 135a is inserted into and fixed to the second yoke 131a2 of the outer stator 131a in a radial direction such that a first inner magnet 135a1 may be provided from a pole (not shown) that forms an inner circumference surface of the second yoke 131a2 to an intermediate height of the second yoke 131a2 and a first outer magnet 135a2 may be provided from the intermediate height of the second yoke 131a2 to an outer circumference surface of the second yoke 131a2.

Here, the first inner magnet 135a1 and the second outer magnet 135a2 may be formed of different materials. For example, the first inner magnet 135a1 may be formed of the ferrite magnet and the first outer magnet 135a2 may be formed of the Nd magnet of rare earth.

As described above, as the Nd magnet with a large amount of magnetic flux is partially used, it is possible to reduce manufacturing expenses of the entire magnet in comparison with a conventional art and to increase an amount of magnetic flux of a motor in comparison with the above-described embodiment.

Furthermore, the materials of the first inner magnet 135a1 and the first outer magnet 135a2 may be reversely arranged. That is, contrary to the previously described embodiment, the first inner magnet 135a1 and the first outer magnet 135a2 may be respectively formed of the Nd magnet and the ferrite magnet.

Figure 10:
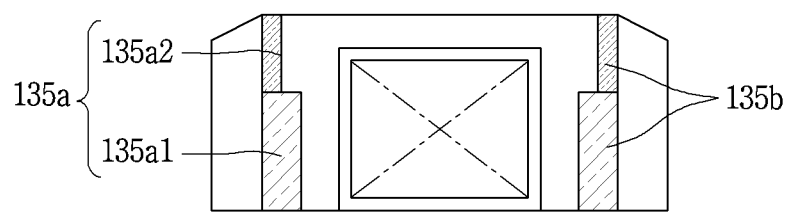

Furthermore, radial direction lengths or axial direction thicknesses of the first inner magnet 135a1 and the first outer magnet 135a2 may vary. For example, considering the manufacturing expenses of the motor, it may be advantageous that the ferrite magnet be longer or a thickness of the Nd magnet be smaller than that of the ferrite magnet. On the other hand, considering an output of the motor, the Nd magnet may be longer than the ferrite magnet. When the output of the motor is considered, while forming the Nd magnet to be longer than the ferrite magnet, a thickness of the Nd magnet may be smaller than that of the ferrite magnet so that it is possible to prevent the manufacturing expenses of the magnet from excessively increasing. FIG. 10 illustrates an example in which the thickness of the first outer magnet 135a2 that is the Nd magnet is smaller than that of the first inner magnet 135a1 that is the ferrite magnet.

As described above, when the axial direction thicknesses of the first inner magnet 135a1 and the first outer magnet 135a2 are equal, it is not necessary to limit the material of the inner magnet and the material of the outer magnet. However, when the axial direction thicknesses of the first inner magnet 135a1 and the first outer magnet 135a2 are different, that is, when the Nd magnet is thinner than the ferrite magnet, it may be advantageous that the ferrite magnet be positioned in a place of the inner magnet. When the thinner Nd magnet is positioned in the place of the inner magnet, a length of the movable element core should increase considering stroke of the mover 132. Therefore, the length of the movable element core heavier than the connection frame increases so that effect of reducing a weight may be reduced. Therefore, when the Nd magnet is thinner than the ferrite magnet, the ferrite magnet may be positioned in the place of the inner magnet. The previously described embodiment may be applied to the second magnet in the same way. Detailed description thereof will not be given.

On the other hand, still another embodiment of the magnet structure of the linear motor according to the present invention will be described as follows.

That is, in the above-described embodiment, one magnet is provided in each of the second yoke and the third yoke in an axial direction. However, according to a current embodiment, a plurality of magnets may be provided in each of the second yoke and the third yoke in the axial direction. FIG. 11 is a schematic diagram illustrating another embodiment of a magnet in a linear motor according to the current embodiment.

As illustrated in FIG. 11, in at least one of the first magnet 135a and the second magnet 135b, a plurality of magnets may be separate from each other at predetermined intervals in the axial direction. In the drawing, an example in which each of the first magnet 135a and the second magnet 135b is formed of a plurality of magnets is illustrated. Hereinafter, the first magnet will be described as a representative example and description of the second magnet will not be given.

In the first magnet 135a, a plurality of magnets may be provided to be separate from each other in the axial direction. Therefore, the first magnet 135a is formed of a first front magnet 135a3 remote from the wound coil 133 and a first rear magnet 135a4 close to the wound coil 133 and a first separator 138a that forms a portion of the second yoke 131a2 may be positioned between the first front magnet 135a3 and the first rear magnet 135a4. The first separator 138a may effectively form a magnetic circuit such as demagnetization while forming a kind of magnetic resistance.

Here, in the second magnet 135b, based on the wound coil 133, a magnet remote from the wound coil 133 may be referred to as a second rear magnet 135b3 and a magnet close to the wound coil 133 may be referred to as a second front magnet 135b4. In the drawing, 138b is a second separator.

As described above, when the separators 138a and 138b are provided between the first front magnet 135a3 and the first rear magnet 135a4 and between the second rear magnet 135b3 and the second front magnet 135b4, magnetic resistance is formed or demagnetization is performed so that an effective magnetic circuit may be formed. In particular, when magnetic resistance is controlled by properly setting thicknesses of the separators 138a and 138b, a thrust constant of the linear motor changes and stiffness of the magnetic resonance spring may be controlled. Therefore, since a design in which a mechanical resonance spring is replaced by the magnetic resonance spring may be performed, it is possible to lighten the linear compressor and to reduce manufacturing expenses of the linear compressor.

In addition, since it is possible to increase stiffness of the spring so as to be suitable for high speed driving in accordance with the design of the magnetic resistances (the separators) 138a and 138b, it is efficient in comparison with the case in which, when stiffness of the mechanical resonance spring increases, mass of the vibrating mechanical resonance spring increases.

Figure 12:
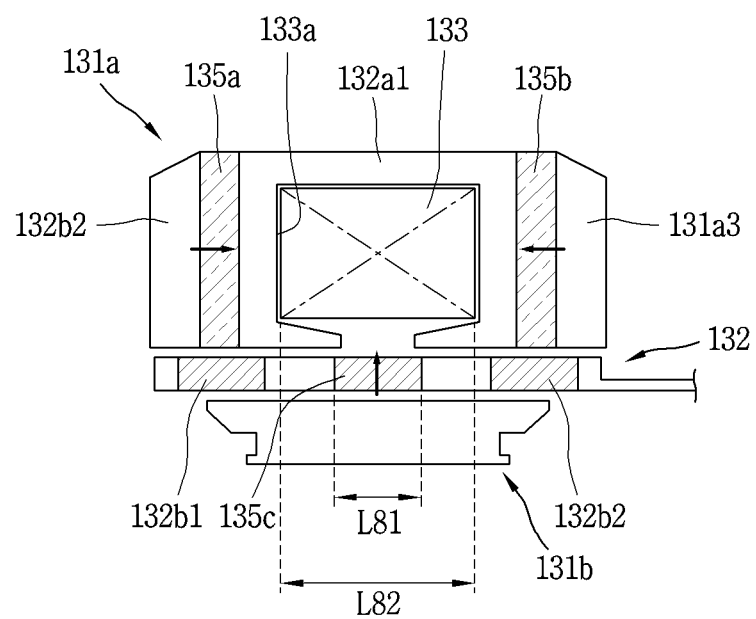
FIG. 12 is a schematic diagram illustrating an example in which a magnet is provided in a mover in the linear motor according to the current embodiment.

On the other hand, still another embodiment of the magnet structure of the linear motor according to the present invention will be described as follows. That is, in the above-described embodiments, only the movable element core is provided in the mover and the magnet is provided in the stator. However, in the current embodiment, the magnet that is the permanent magnet is also provided in the mover. FIG. 12 is a schematic diagram illustrating an example in which a magnet is provided in a mover in the linear motor according to the current embodiment.

As illustrated in FIG. 12, a third magnet 135c may be provided in a cylinder portion of the connection frame 132a. The third magnet 135c may be inserted into and combined with a groove provided in the cylinder portion of the connection frame 132a like the movable element core 132b.

The third magnet 135c is provided between the both movable element cores, that is, between the first movable element core 132b1 corresponding to the first magnet 135a and the second movable element core 132b2 corresponding to the second magnet 135b and may be provided approximately in a position that overlaps the wound coil 133 in a radial direction.

The third magnet 135c may be formed of the ferrite magnet. When the third magnet 135c is the ferrite magnet, an axial direction length of the magnet increases so that the weight of the mover increases. On the other hand, when the third magnet 135c is the Nd magnet, the axial direction length of the magnet is reduced so that the weight of the mover may be reduced.

The axial direction length L81 of the third magnet 135c may be larger than or equal to a minimum distance L82 between the pole of the first yoke 131a2 and the pole of the third yoke 131a3. However, when the axial direction length L81 of the third magnet 135c is increased so that the axial direction length L81 of the third magnet 135c is larger than the minimum distance L82 between the both poles, as described above, the weight of the mover may increase. Therefore, in order to prevent the weight of the mover 132 from increasing and to properly secure the axial direction length L81 of the third magnet 135c, ends of the both poles may longitudinally extend toward the wound coil 133.

As illustrated in FIG. 12, when the first magnet 135a and the second magnet 135b are provided in the outer stator 131a, a magnetization direction of the third magnet 135c may be a radial direction so that magnetic flux is formed from an inner side to an outer side.

As described above, when the third magnet 135c is provided in the mover 132, the amount of magnetic flux of the motor increases so that the motor may be miniaturized.

Figure 13A:
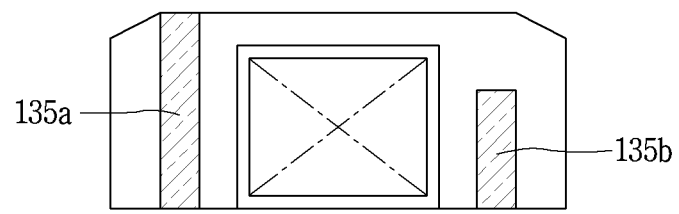
FIGS. 13A and 13B are schematic diagrams illustrating other embodiments of a first magnet and a second magnet in the linear motor according to the current embodiment.
Figure 13B:
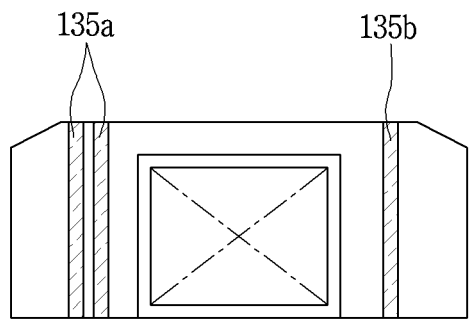

On the other hand, still another embodiment of the magnet structure of the linear motor according to the present invention will be described as follows. That is, in the above-described embodiments, the first magnet and the second magnet are symmetrical with each other. However, according to the current embodiment, the first magnet and the second magnet may be unsymmetrical with each other. FIGS. 13A and 13B are schematic diagrams illustrating other embodiments of a first magnet and a second magnet in the linear motor according to the current embodiment.

For example, as illustrated in FIGS. 13A and 13B, a surface area of the first magnet 135a may be larger than that of the second magnet 135b. Although not shown in the drawing, the reverse may be established. In FIGS. 13A and 13B, it may be advantageous that the surface area of the magnet (in the drawing, the first magnet) close to the compression chamber be larger than that of the magnet positioned in the opposite side. In general, due to a characteristic of the linear compressor, gas force is generated by the refrigerant compressed in the compression chamber so that more thrust may be required during compression stroke. Therefore, when the magnetic circuits are the same, the surface area of the magnet close to the compression chamber (for example, the first magnet) may be larger than that of the second magnet.

For this purpose, as illustrated in FIG. 13A, a radial direction length of the first magnet 135a may be larger than that of the second magnet 135b or, as illustrated in FIG. 13B, the first magnet may be plural and the second magnet may be singular. In addition, although not shown in the drawing, the first magnet may be the Nd magnet and the second magnet may be the ferrite magnet.

As described above, when the surface area of the first magnet and the surface area of the second magnet are symmetrical with each other, the motion of the mover is uniform so that reliability may improve.

However, as described above, due to the characteristic of the linear compressor, since the piston and the mover may be slightly pushed toward the rear (a direction remote from the compression chamber) by pressure of the compression chamber, in order to compensate for such a phenomenon, it may be advantageous that the surface area of the first magnet be unsymmetrical with that of the second magnet, in particular, the surface area of the first magnet be larger than that of the second magnet when compression stroke is performed on the compressor.

Figure 14:
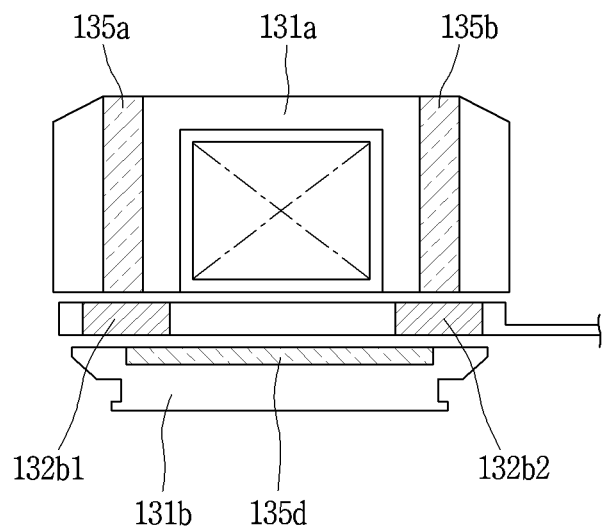
FIGS. 14 and 15 are schematic diagrams illustrating other embodiments of the linear motor according to the current embodiment.

On the other hand, as illustrated in FIG. 14, a fourth magnet 135d may be longitudinally provided in the inner stator 131b or on a surface that forms an air gap in an axial direction. In this case, as the inner stator 131b is formed to be cylindrical by radially laminating a plurality of lamination sheets, the magnet is cylindrical or arc-shaped so that the magnet may be longitudinally inserted into the inner stator 131b in the axial direction.

As described above, even when the magnet is inserted into the inner stator, the surface area of the magnet may increase. Therefore, an enough output may be secured while using the ferrite magnet, which is similar to the above-described embodiments. In this case, since the magnet is provided in the inner stator, the linear motor and the linear compressor may be miniaturized for the same output.

Figure 15:
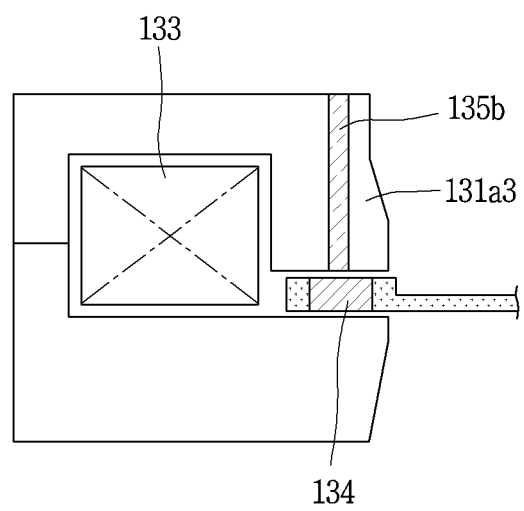

On the other hand, in the above-described embodiments, the linear motor in which air gaps are respectively provided at both sides of the wound coil is described, which may be applied to the case in which an air gap is formed only at one side of the wound coil and a yoke is formed at the other side of the wound coil. According to the current embodiment, as illustrated in FIG. 15, the magnet 135b may be provided only in the yoke 131a3 that forms the air gap 134 in the yokes positioned at both sides of the wound coil 133. In this case, since an amount of use of the magnet may be secured while reducing an axial direction length of the yoke in which the magnet is provided, it is advantageous to miniaturization. In this case, it is possible to reduce manufacturing expenses by using the ferrite magnet or to increase motor efficiency by using the Nd magnet.

In addition, although not shown in the drawing, magnets may be respectively inserted into the yokes positioned at both sides of the wound coil. In this case, since the both yokes are unsymmetrical with each other, the both magnets may be also unsymmetrical with each other. In this case, an amount of use of the magnet may also increase so that it is possible to maintain motor efficiency while using a low-priced magnet such as the ferrite magnet.

What is claimed is:
1. A linear motor comprising:
a stator that defines an axial space;
a coil located at the stator;
a mover located in the axial space and configured to reciprocate relative to the stator along a reciprocating direction; and
at least one magnet fixed to the stator,
wherein a first length of the magnet in a first direction that intersects the reciprocating direction is greater than a second length of the magnet in a second direction corresponding to the reciprocating direction, wherein the stator comprises:
- a first yoke that defines an axial magnetic path along the second direction corresponding to an axial direction of the stator,
- a second yoke located at a first side of the first yoke in the second direction, and
- a third yoke located at a second side of the first yoke in the second direction, each of the second yoke and the third yoke defining a radial magnetic path in the first direction corresponding to a radial direction of the stator, wherein the magnet comprises a plurality of magnets,
wherein the second yoke defines a first insertion groove that extends in the first direction and that receives one of the plurality of magnets,
wherein the third yoke defines a second insertion groove that extends in the first direction and that receives one of the plurality of magnets, and
wherein (i) a cross-sectional area of a portion of the second yoke outside the first insertion groove defined along the second direction is larger than or equal to a cross-sectional area of the first yoke defined along the first direction, or (ii) a cross-sectional area of a portion of the third yoke outside the second insertion groove defined along the second direction is larger than or equal to the cross-sectional area of the first yoke defined along the first direction.

2. The linear motor of claim 1, wherein the magnet is entirely made of a ferrite magnet.

3. The linear motor of claim 1,
wherein one or more of the plurality of magnets comprise a ferrite magnet.

4. The linear motor of claim 3, wherein a surface area of the ferrite magnet among the plurality of magnets is greater than a surface area of any other magnet among the plurality of magnets.

5. The linear motor of claim 1, wherein the plurality of magnets are positioned at one side of the coil in the second direction.

6. The linear motor of claim 5, wherein the plurality of magnets are spaced apart from each other in the second direction by a predetermined distance.

7. The linear motor of claim 5, wherein the plurality of magnets are arranged in the first direction.

8. The linear motor of claim 1, wherein the first insertion groove is positioned at a center portion of the second yoke in the second direction, and
wherein the second insertion groove is positioned at a center portion of the third yoke in the second direction.

9. The linear motor of claim 1, wherein the mover comprises a magnetic substance core that is different from a permanent magnet, and
wherein a length of the magnetic substance core in the second direction is greater than a length of the magnet in the second direction.

10. The linear motor of claim 1, wherein the mover comprises at least one magnetic substance core, and
wherein the magnetic substance core overlaps the magnet in the second direction based on the mover being positioned at an alignment state in which a center of the mover in the second direction corresponds to a center of the stator in the second direction.

11. The linear motor of claim 10, wherein the mover further comprises a mover magnet, and wherein the mover magnet is positioned outside the magnet in the second direction based on the mover being positioned at the alignment state.

12. The linear motor of claim 11, wherein the magnetic substance core comprises a first core and a second core that are arranged in the second direction, and
wherein the mover magnet is located between the first core and the second core in the second direction.

13. The linear motor of claim 12, wherein a length of the mover magnet in the second direction is less than a length of the coil in the second direction.

14. The linear motor of claim 1, wherein the stator comprises an inner stator and an outer stator located radially outward of the inner stator, and
wherein the outer stator is spaced apart from the inner stator to define the axial space that receives the mover.

15. The linear motor of claim 14, wherein the outer stator defines an insertion groove that receives the magnet and that extends through the outer stator in the first direction.

16. A linear compressor comprising:
- a compression unit comprising a cylinder configured to receive refrigerant and a piston located in the cylinder and configured to reciprocate in the cylinder, the compression unit being configured to compress the refrigerant based on the piston reciprocating in the cylinder; and
- a driving unit configured to cause the piston to reciprocate in the cylinder, the driving unit comprising:
  - a stator that defines an axial space,
  - a coil located at the stator,
  - a mover located in the axial space and coupled to the piston, the mover being configured to reciprocate relative to the stator in a reciprocating direction, and
  - at least one magnet fixed to the stator, wherein a first length of the magnet in a first direction that intersects the reciprocating direction is greater than a second length of the magnet in a second direction corresponding to the reciprocating direction, wherein the stator comprises:
- a first yoke that defines an axial magnetic path along the second direction corresponding to an axial direction of the stator,
- a second yoke located at a first side of the first yoke in the second direction, and
- a third yoke located at a second side of the first yoke in the second direction, each of the second yoke and the third yoke defining a radial magnetic path in the first direction corresponding to a radial direction of the stator, wherein the magnet comprises a plurality of magnets,
wherein the second yoke defines a first insertion groove that extends in the first direction and that receives one of the plurality of magnets,
wherein the third yoke defines a second insertion groove that extends in the first direction and that receives one of the plurality of magnets, and
wherein (i) a cross-sectional area of a portion of the second yoke outside the first insertion groove defined along the second direction is larger than or equal to a cross-sectional area of the first yoke defined along the first direction, or (ii) a cross-sectional area of a portion of the third yoke outside the second insertion groove defined along the second direction is larger than or equal to the cross-sectional area of the first yoke defined along the first direction.

* * * * *